(12) United States Patent
Boccuzzi et al.

(10) Patent No.: US 6,570,938 B1
(45) Date of Patent: May 27, 2003

(54) METHOD AND APPARATUS FOR RECOVERING DATA SYMBOLS FROM A SIGNAL RECEIVED BY A RADIO COMMUNICATION DEVICE

(75) Inventors: Joseph Boccuzzi, Brooklyn, NY (US); Clinton C Powell, II, Boynton Beach, FL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 08/641,396

(22) Filed: May 1, 1996

(51) Int. Cl.[7] .................................................. H03D 1/00
(52) U.S. Cl. .......................... 375/340; 375/343; 370/329
(58) Field of Search ................................. 375/207, 235, 375/261, 298, 316, 324, 340, 343, 350, 364; 370/329, 341

(56) References Cited

U.S. PATENT DOCUMENTS

| | | | | |
|---|---|---|---|---|
| 5,164,965 A | | 11/1992 | Karaali ........................ 375/106 |
| 5,491,726 A | * | 2/1996 | Cheng et al. ................ 375/343 |
| 5,511,099 A | * | 4/1996 | Ko et al. ...................... 375/343 |
| 5,588,025 A | * | 12/1996 | Stroll et al. .................. 375/316 |
| 5,623,511 A | * | 4/1997 | Bar-David et al. .......... 375/343 |
| 5,652,764 A | * | 7/1997 | Kanzaki et al. .............. 375/207 |
| 5,687,190 A | * | 11/1997 | Tsao ............................ 375/207 |

\* cited by examiner

*Primary Examiner*—Edward F. Urban
*Assistant Examiner*—Congvan Tran
(74) *Attorney, Agent, or Firm*—Randi L. Dulaney

(57) ABSTRACT

A signal processor (125) for recovering data symbols from a received signal includes matched filters (210, 215) for receiving and filtering a quadrature (Q) signal component of the received signal. A detector (225) is coupled to the matched filters (210, 215) for selecting a filtered signal provided by one of the matched filters (210, 215) and for labeling the filtered signal according to a magnitude and phase of the filtered signal to provide a Q channel output flag. A Q channel symbol/sign decoder (235) then processes the Q channel output flag to generate a Q channel magnitude variable and a polarity variable, and a symbol decoder (240) coupled to the Q channel symbol/sign decoder (235) generates a data symbol in accordance with the Q channel magnitude variable and the polarity variable.

13 Claims, 7 Drawing Sheets

METHOD AND APPARATUS FOR RECOVERING DATA SYMBOLS FROM A SIGNAL RECEIVED BY A RADIO COMMUNICATION DEVICE

FIELD OF THE INVENTION

This invention relates in general to radio communication devices, and more specifically to a method and apparatus in such a device for recovering data symbols from a received signal.

BACKGROUND OF THE INVENTION

Radio communication devices receive selective call messages that have been formatted according to conventional signalling protocols and transmitted as radio signals. Typically, a radio communication device receives the radio frequency (RF) signal, which is mixed down to an intermediate frequency (IF) signal. The IF signal is then processed down to baseband for recovery of data therefrom. However, this method of demodulating the signal to recover data symbols is complex and requires a large amount of circuitry that can consume valuable space within the communication device. Therefore, direct conversion, or zero IF, receivers have been developed for use in communication devices in which space is limited. Direct conversion receivers convert a received RF signal directly to baseband without ever generating an IF signal. Although such direct conversion receivers are generally smaller, conventional demodulation and data recovery techniques are not always suitable for use in direct conversion receivers. Therefore, what is needed is an alternative method of demodulation and data symbol recovery for use with a direct conversion receiver included in a radio communication device.

DESCRIPTION OF A PREFERRED EMBODIMENT

Figure 1:
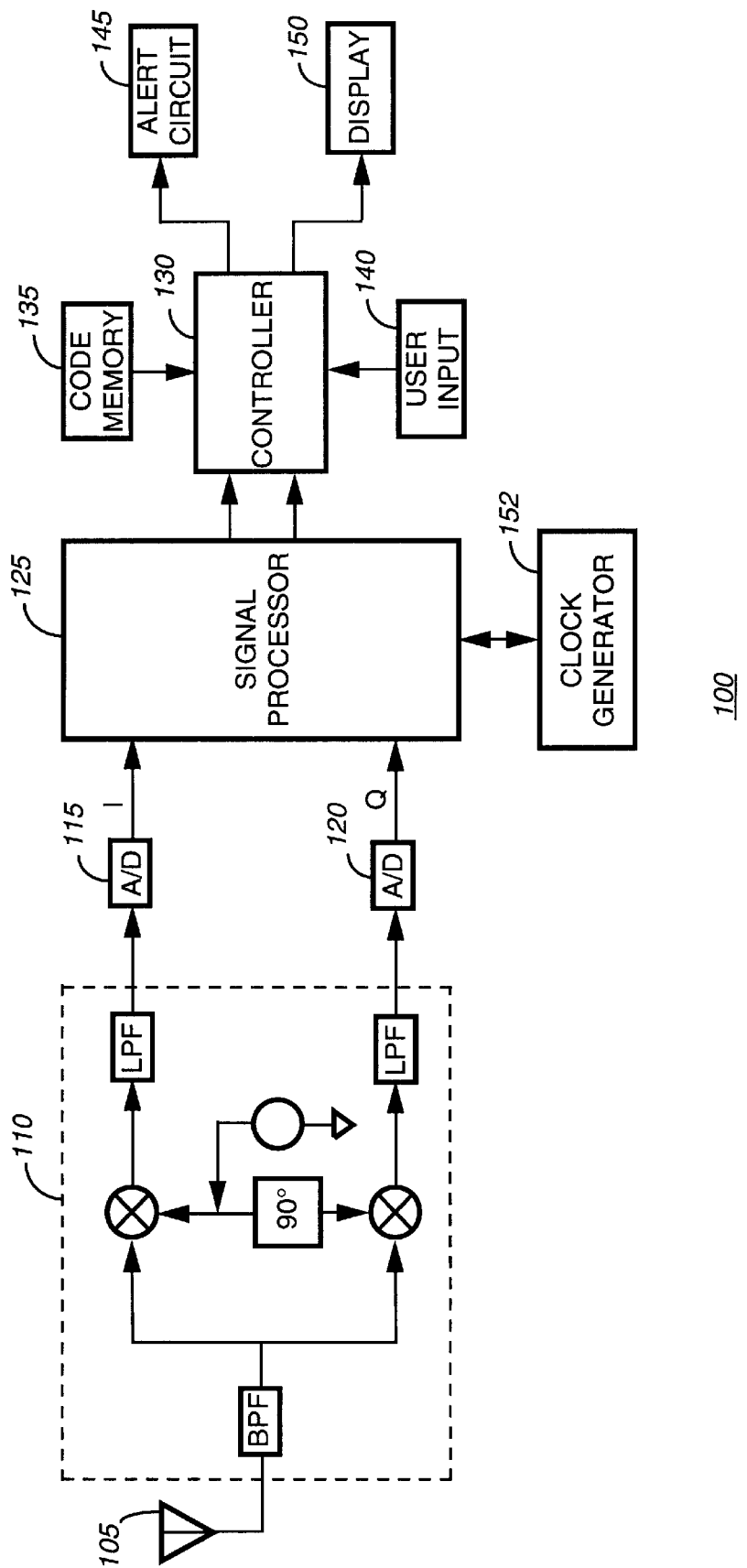
FIG. 1 is an electrical block diagram of a radio communication device in which symbols are decoded according to the present invention.

FIG. 1 is an electrical block diagram of a radio communication device 100, such as a portable messaging device, for receiving a radio frequency (RF) signal via an antenna 105. A receiver 110 coupled to the antenna 105 processes the received signal to generate in-phase (I) and quadrature (Q) signal components, or I and Q channels, in a manner well known to one of ordinary skill in the art. Preferably, the receiver 110 comprises a direct conversion, or zero IF, receiver for converting the RF signal directly to baseband.

The radio communication device 100 further comprises analog-to-digital (A/D) converters 115, 120 coupled to the receiver 110 for providing digital outputs corresponding, respectively, to the analog values of the I and Q channels. A signal processor 125 coupled to the A/D converters 115, 120 demodulates the digital I and Q signal components to generate data symbols from the signal components. The signal processor is preferably implemented in software, although it will be appreciated that hardware capable of performing equivalent operations can alternatively be employed.

A controller 130 coupled to the signal processor 125 recovers information, such as selective call messages, from the data symbols. When a recovered message includes an address equivalent to the receiver address stored in a programmable code memory 135, the controller 130 activates an alert circuit 145 to generate an alert announcing reception of a selective call message to the user. The user of the device 100 can then read the message by activating user input controls 140, in response to which the message is provided to a display 150. A clock generator 152 is preferably included in the radio communication device 100 for processing the I and Q channels to determine a sampling time referred to by the signal processor 125 in generating data symbols, as will be described in greater detail below.

The RF signal received by the radio communication device 100 is preferably a four-level signal. For example, the signal could be modulated at the transmitter (not shown) as four-level FM (frequency modulation) according to the FLEX™ modulation scheme or the ERMES (European Radio Messaging Service) modulation scheme. The RF signal is mathematically represented as follows.

$$S_f(t) = A[\cos\{\omega_c t + \alpha(t) 2\pi f_d t\}] \tag{1}$$

In equation (1), $f_d$ represents the frequency deviation, and $\alpha(t)$ represents the symbol levels. These two variables can be expressed mathematically by the following two equations:

$$f_d = \frac{\text{(symbol rate)}}{2}, \text{ and} \tag{2}$$

$$a(t) = +/-1, +/-3. \tag{3}$$

The real and imaginary parts of the signal are mathematically represented by the following equations:

$$S_I(t) = \cos\{\alpha(t) 2\pi f_d t\}, \tag{4}$$

and $$S_Q(t) = \sin\{\alpha(t) 2\pi f_d t\}, \tag{5}$$

where $S_I(t)$ represents the real component, and $S_Q(t)$ represents the imaginary component.

Since these equations describe an orthogonal system, the signal can be viewed as two binary systems overlaid on each other. The two inner frequency deviations have a modulation index, $\beta$, equal to one (1), while the two outer frequency deviations have a modulation index of $\beta=3$. The number of cycles per symbol is equal to $\beta/2$. Therefore, for the +/−1 level symbols, there is half a cycle per symbol, and for the +/−3 level symbols, there are one-and-a-half (1.5) cycles per symbol.

Figure 2:
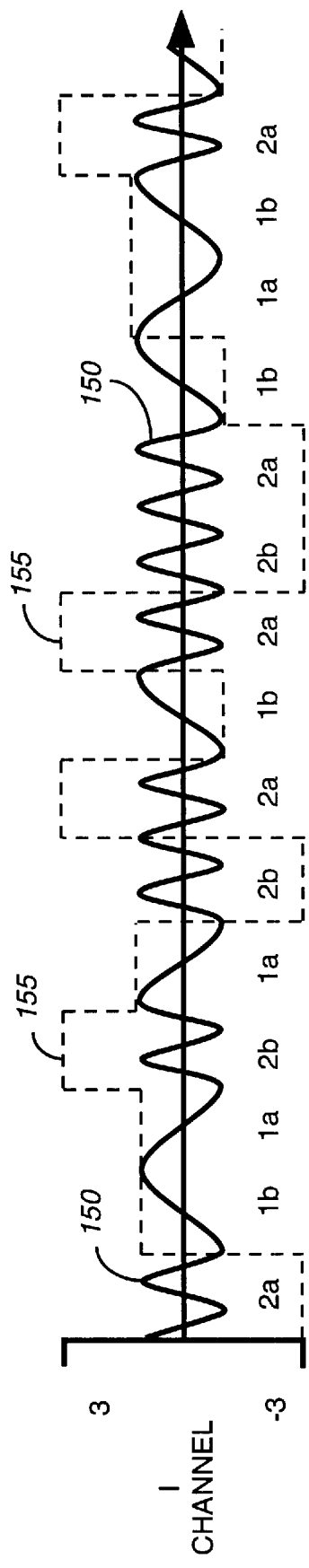
FIGS. 2 and 3 are signal diagrams depicting I and Q channels waveforms generated from incoming signals by the radio communication device of FIG. 1 according to the present invention.
Figure 3:
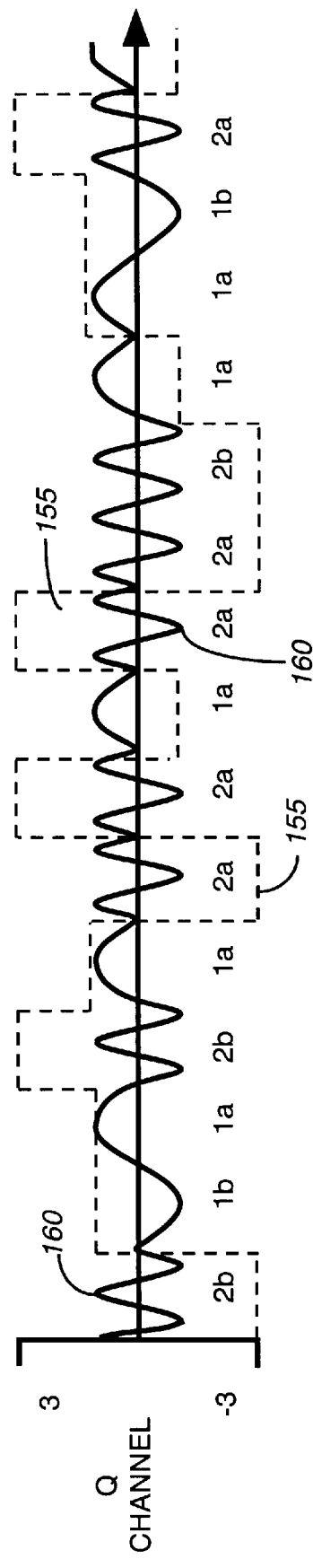

FIGS. 2 and 3 are signal diagrams depicting baseband signals for the I channel (FIG. 2) and Q channel (FIG. 3). In FIG. 2, the baseband I channel signal 150 is depicted with an overlay of random data 155, shown as a broken line. The signals 150, 155 have been labeled, using number and letter designations, as "1a", "1b", "2a", and "2b", wherein "1a" corresponds to the first half of a cosine wave, and "1b" corresponds to its negative. "2a" corresponds to the first 1.5 cycles of a cosine wave, and "2b" corresponds to its negative. The number prefix, i.e., "1" or "2", is representative of the present symbol. Specifically, when the present symbol is either a +1 or a −1, the number prefix "1" is chosen. When the present symbol is either a +3 or a −3, the number prefix "2" is chosen. FIG. 2 illustrates the alternating pattern of "a" and "b" labels for the I channel signal 150.

In FIG. 3, the baseband Q channel signal 160 is overlaid with random data 155. As shown, "1a" corresponds to the first half of a sine wave, and "1b" corresponds to its negative. "2a" corresponds to the first 1.5 cycles of a sine wave, and "2b" corresponds to its negative. The selection of the number prefixes is performed as described above with reference to FIG. 2. When, in FIG. 3, there is a symbol polarity change between the present symbol and the past, the present waveform will be represented by the signal letter ("a" or "b") of the past signal letter. When there is no symbol polarity change, the present waveform is labeled with a different letter. For instance, when there is no symbol polarity change, the present waveform would be labeled with a "b" if the past symbol had been labeled with an "a" and vice versa. Although the same number/letter designations have been used as designations for both channels, the designations are unrelated with respect to the I channel (FIG. 2) and the Q channel (FIG. 3).

Preferably, the RF signal transmitted to the radio communication device 100 has been transmitted with no premodulation filtering in order to accentuate the sharp phase reversals. The purpose of a pre-modulation filter in a transmitter (not shown) is to collapse sharp phase reversals to produce a more spectrally efficient signal. However, the overall shapes of the waveforms are not changed by pre-modulation filtering.

Figure 4:
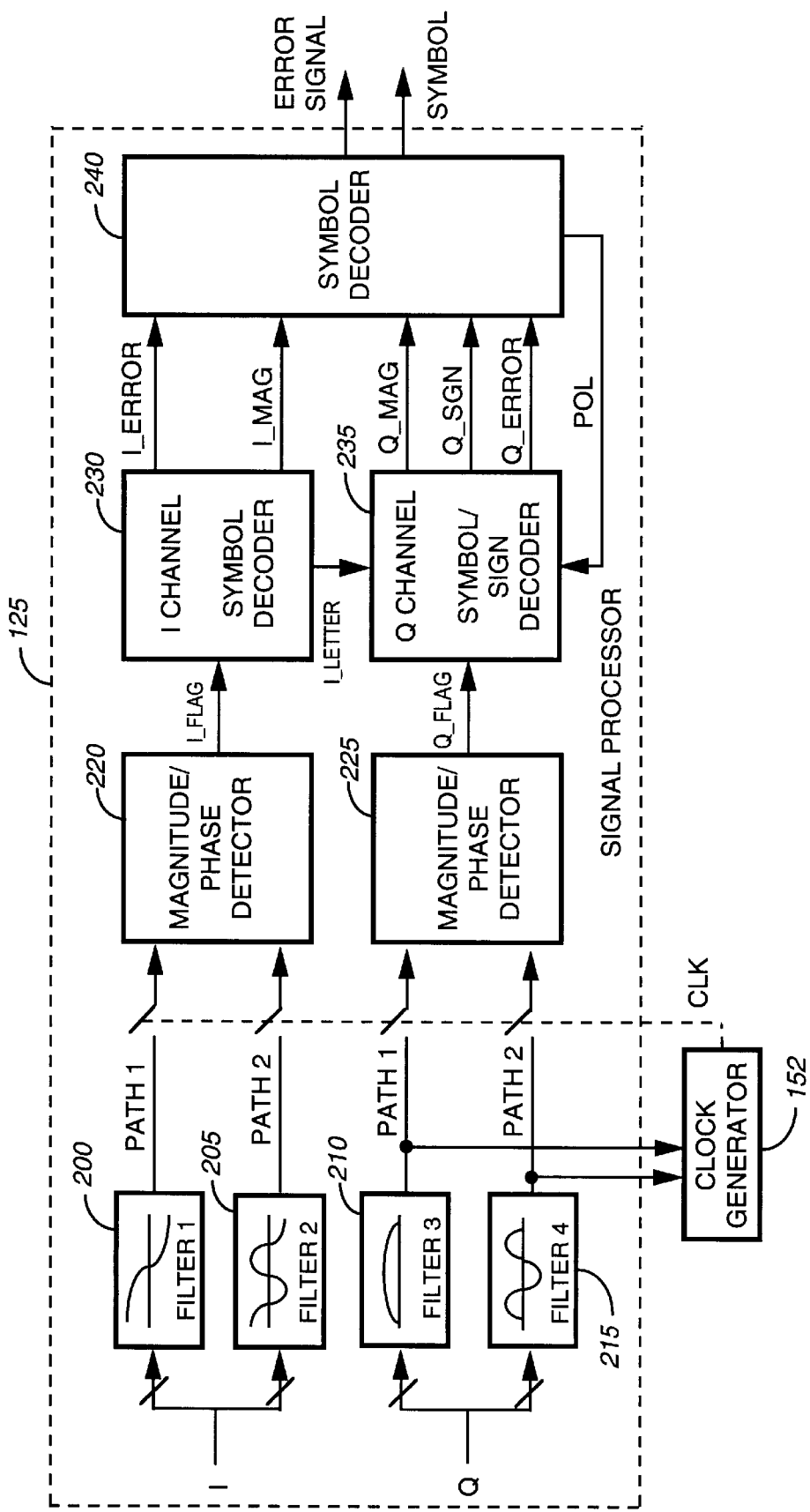
FIG. 4 is an electrical block diagram of a signal processor included in the radio communication device of FIG. 1 according to the present invention.

FIG. 4 is an electrical block diagram of the signal processor 125 according to the present invention. Preferably, the signal processor 125 comprises a bank of two matched filters 200, 205 for receiving and processing the I channel in a conventional manner. Other matched filters 210, 215, i.e., a bank of two Q channel matched filters, receive and process the Q channel in a conventional manner. Magnitude/phase detectors 220, 225 are respectively coupled to the I channel filters 200, 205 and the Q channel filters 210, 215 for receiving filtered signals from the matched filters 200, 205, 210, 215 and outputting signals indicative of selected number/letter designations, i.e., the labels, of the channels each time the channels are sampled. The sampling time is determined responsive to an output of the clock generator 152.

According to the present invention, the magnitude/phase detector 220 in the I channel path first selects a filtered signal by determining which of the two filtered signals provided by those first bank of matched filters, 200, 205 has a greater amplitude when the signals are sampled. When the "path 1" signal, i.e., the signal provided by the first filter 200, has the greater amplitude, the number designation is selected to be "1" for the sampled I channel. When the "path 2" signal, i.e., the signal provided by the second filter 205, is greater in amplitude, the number designation is selected to be "2". The letter designation is chosen as "a" when the amplitude of the selected signal is positive and "b" when the amplitude of the selected signal is negative. In this manner, a label (letter/number designation) of either "1a", "1b", "2a", or "2b" is assigned to each sample of the I channel. In implementation, the magnitude/phase detector 220 can, for instance, include four output ports, each dedicated to a particular one of the four labels. The selected label can then be indicated by generating a predetermined signal, such as a digital high, at the port corresponding to the selected label. The predetermined signal will be hereinafter referred to as the I channel output flag (I_FLAG).

The magnitude/phase detector 225 located in the Q channel path first selects a second filtered signal from the Q channel bank of matched filters 210, 215 and similarly outputs a signal indicative of a selected signal label. The number designation is chosen as "1" when the "path 1" signal, i.e., the filtered signal provided by the filter 210, is greater in amplitude than the "path 2" signal, i.e., the filtered signal provided by the filter 215. When the "path 2" signal is greater in amplitude, the number designation is chosen as "2". The letter designation is then selected as "a" when the amplitude of the selected signal is positive and "b" when the amplitude of the selected signal is negative. The signal provided by the magnitude/phase detector 225 will be referred to hereinafter as the Q channel output flag (Q_FLAG).

According to the present invention, an I channel symbol decoder 230 is coupled to the magnitude/phase detector 220 in the I channel path for processing the signals provided thereto by the magnitude/phase detector 220. A Q channel symbol/sign decoder 235 preferably receives the Q channel output flag (Q_FLAG) from the Q channel magnitude/phase detector 225 and at least a portion of the I channel output flag (I_FLAG) from the I channel symbol decoder 230 to generate various output signals.

Additionally, a symbol polarity variable POL is preferably received from a symbol decoder 240. The decoders 230, 235 preferably provide signals I_MAG, I_ERROR, Q_MAG, Q_SGN, and Q_ERROR to the symbol decoder 240, which provides an indication of the current data symbol to the controller 130 (FIG. 1). Preferably, the symbol decoder 240 includes output means for providing error information about the current data symbol to the controller 130.

Figure 5:
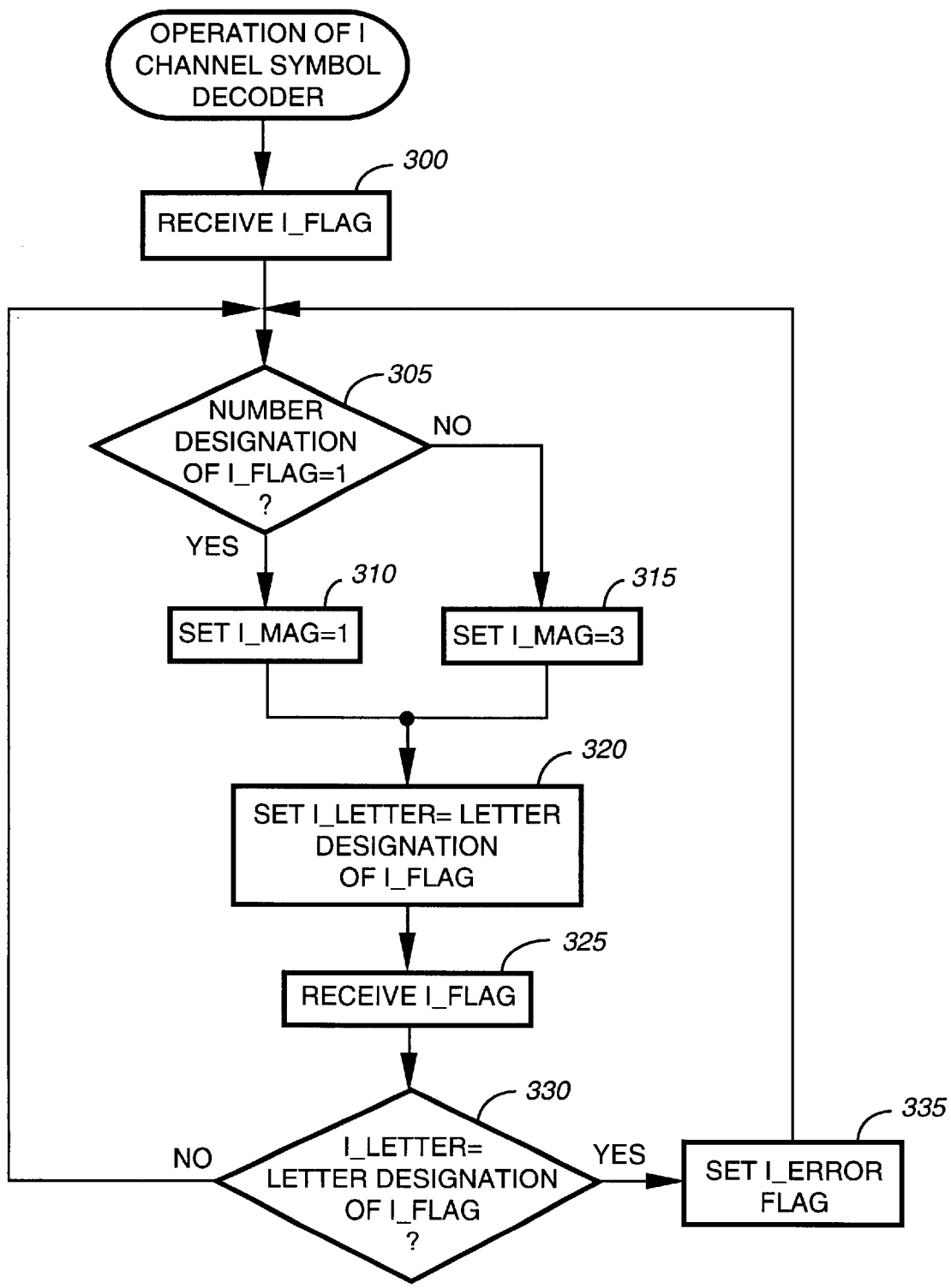
FIG. 5 is a flowchart illustrating an operation of an I channel symbol decoder included in the radio communication device of FIG. 1 according to the present invention.

FIG. 5 is a flowchart illustrating the operation of the I channel symbol decoder 230. At step 300, the decoder 230 receives the signal I_FLAG, which is indicative of the label associated with the sampled I channel. Thereafter, the decoder 230 determines, at step 305, whether the number designation indicated by I_FLAG is equal to one. When I_FLAG=1, a stored I channel magnitude variable, I_MAG, is set to one, i.e., I_MAG=1, at step 310. When I_FLAG≠1, I_MAG is set to three, i.e., I_MAG=3, at step 315. Then, at step 320, a variable I_LETTER is set to equal the letter designation indicated by I_FLAG, and, at step 325, I_FLAG is received from the magnitude/phase detector 220 again. When, at step 330, the variable I_LETTER is equivalent to the letter designation indicated by the currently received I_FLAG signal, an I channel error flag, I_ERROR, is set, at step 335. When I_LETTER is not equivalent to the letter designation indicated by I_FLAG, processing is continued at step 305.

According to the present invention, I_ERROR and I_MAG are then provided to the symbol decoder 240.

Figure 6:
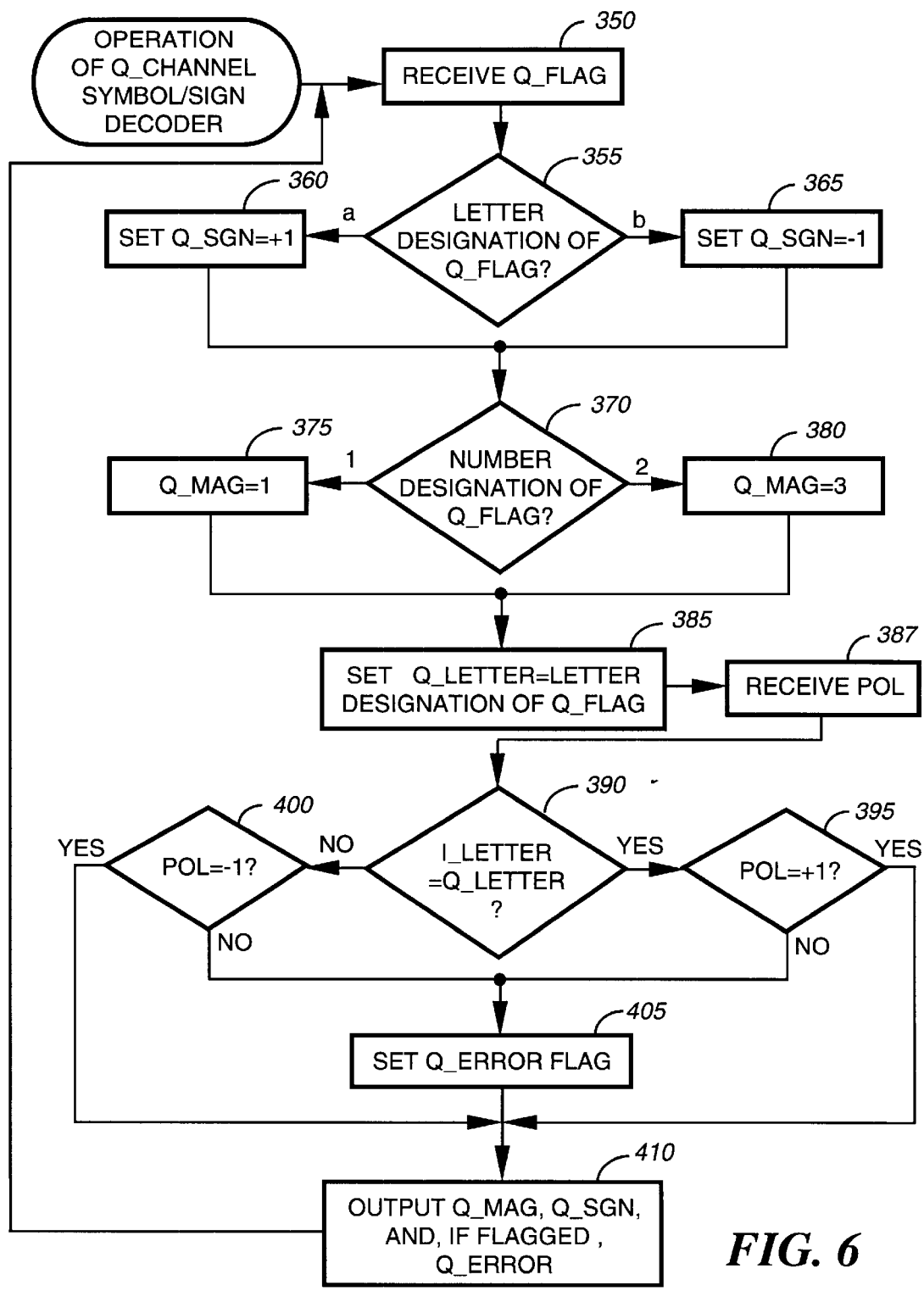
FIG. 6 is a flowchart depicting an operation of a Q channel symbol/sign decoder included in the radio communication device of FIG. 1 according to the present invention.

FIG. 6 is a flowchart illustrating the operation of the Q channel symbol/sign decoder 235. At step 350, Q_FLAG is received from the magnitude/phase detector 225 (FIG. 4). When, at step 355, the letter designation indicated by Q_FLAG comprises "a", a Q channel polarity variable Q_SGN is set to positive one, i.e., Q_SGN=+1, at step 360. When the letter of Q_FLAG is equivalent to "b", Q_SGN is set, at step 365, to equal negative one, i.e., Q_SGN=−1. When, at step 370, the number designation of Q_FLAG equals one, a Q channel magnitude variable, Q_MAG, is set, at step 375, to equal one, i.e., Q_MAG=1. Otherwise, at step 380, Q_MAG is set to three, i.e., Q_MAG=3. Next, at step 385, a variable Q_LETTER is set to the letter designation ("a" or "b") of Q_FLAG.

Steps 387–405 illustrate the process by which an error flag is set for the Q channel. At step 387, the Q channel symbol/sign decoder 235 receives a symbol polarity variable, POL, generated by the symbol decoder 240. Then, at steps 390–405, a Q channel error flag, Q_ERROR, is generated under either of the following two circumstances:

$$I\_LETTER = Q\_LETTER \text{ and } POL \neq +1, \quad (6)$$

or $$I\_LETTER \neq Q\_LETTER \text{ and } POL \neq -1. \quad (7)$$

Preferably, at step 410, the Q channel symbol/sign decoder 235 outputs Q_MAG, Q_SGN, and Q_ERROR, when present, to the symbol decoder 240 (FIG. 4). It will be appreciated by one of ordinary skill in the art that the Q channel error flag could be alternatively generated by the symbol decoder 240 as long as the variables I_LETTER and Q_LETTER are provided thereto.

Figure 7:
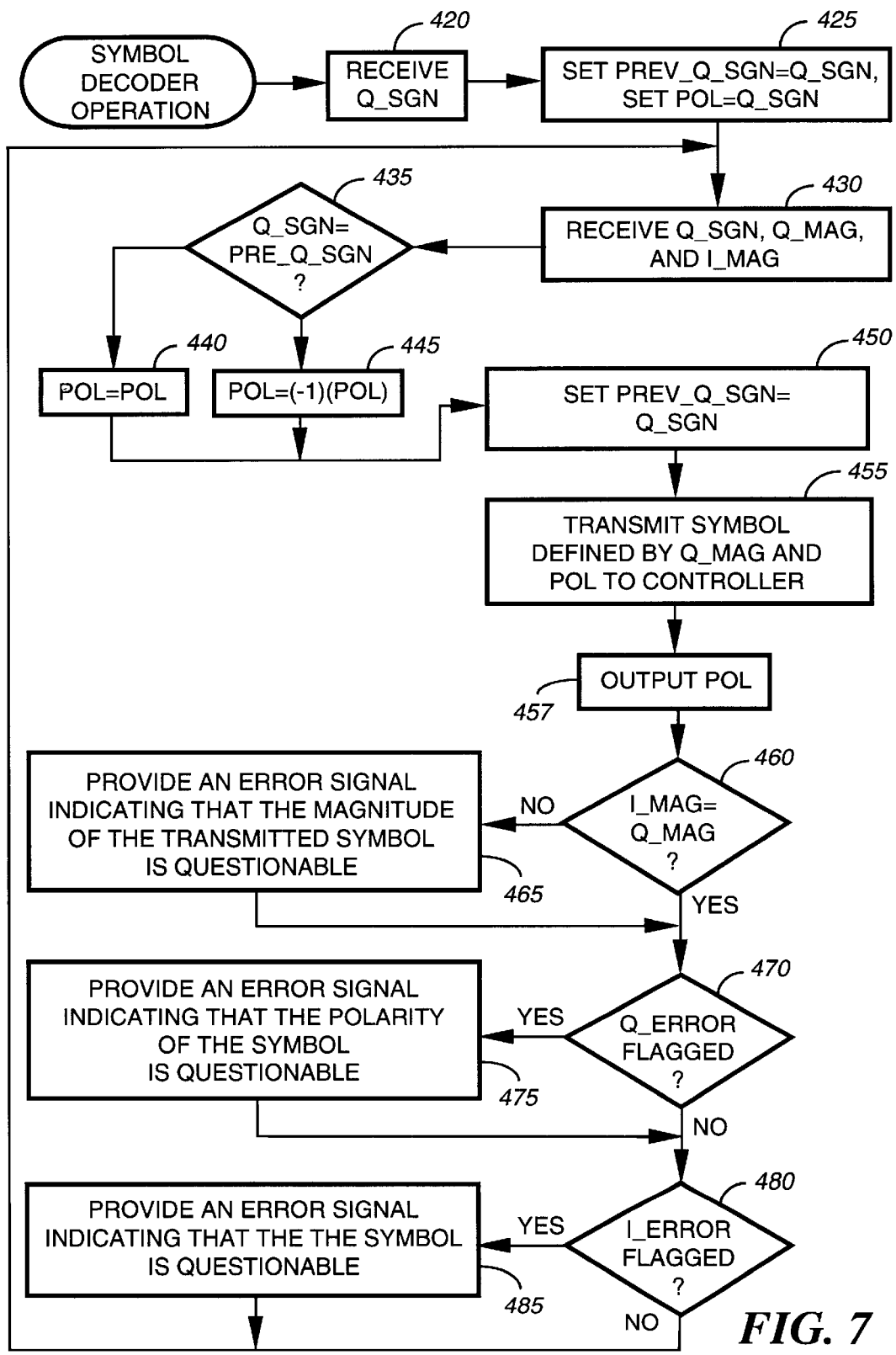
FIG. 7 is a flowchart of an operation of a symbol decoder included in the radio communication device of FIG. 1 according to the present invention.

Referring next to FIG. 7, a flowchart illustrates an operation of the symbol decoder 240 (FIG. 4). Steps 420 and 425 depict an initialization process in which Q_SGN is received, at step 420, from the Q channel symbol/sign decoder 235 during a first sample time. In response to receiving Q_SGN, a variable PREV_Q_SGN is set to Q_SGN, at step 425. Also at step 425, a symbol polarity variable, POL, is set to Q_SGN.

At step 430, during the next sample time, the symbol decoder 240 receives I_MAG, Q_MAG, and Q_SGN. When, at step 435, Q_SGN=PREV_Q_SGN, the sign of the polarity variable POL is changed, i.e., POL=(−1)(POL), at step 445. POL remains the same, at step 440, when Q_SGN≠PREV_Q_SGN, at step 435. Thereafter, at step 450, PREV_Q_SGN is set to the current value of Q_SGN.

The symbol defined by Q_MAG and POL is then determined, at step 455, and transmitted to the controller 130 (FIG. 1), and the variable POL is provided, at step 457, to the Q channel symbol/sign decoder 235. The polarity variable POL comprises either a positive one or a negative one, and Q_MAG comprises a three or a one. Therefore, the product of POL and Q_MAG can define one of four possible data symbols used in a four-level signalling system. For instance, the symbols could be defined according to the following table.

| Product of POL and Q_MAG | Symbol |
|---|---|
| +3 | 11 |
| +1 | 10 |
| −1 | 01 |
| −3 | 00 |

According to the present invention, the symbol decoder 240 can also output various error signals. When, at step 460, I_MAG is not equivalent to Q_MAG, a "magnitude" error signal is generated, at step 465, to indicate that the magnitude of the transmitted symbol is questionable. For example, when the transmitted symbol is associated with a +3, the magnitude error signal indicates to the controller 130 that there is a possibility that the symbol should be "10", which is associated with a +1, rather than "11". When, at step 470, Q_ERROR is flagged, a "polarity" error signal is provided, at step 475, to indicate that the polarity of the transmitted symbol is questionable. The polarity error signal could, for example, indicate that a "10" should instead be a "01". When, at step 480, I_ERROR is flagged, a "symbol" error signal is generated, at step 485, to indicate that the transmitted symbol may be erroneous.

Each type of error signal could, for instance, be transmitted on a dedicated port of the symbol decoder 240 such that the voltage on the port associated with a current error signal could go high from a normal low status. It will be appreciated that alternative methods for transmitting the three different error signals could be used. By way of example, a single port could provide three different predetermined voltages, each indicative of a type of error signal.

It will be appreciated by one of ordinary skill in the art that the symbol polarity variable POL is arbitrarily set equal to Q_SGN during the initialization of the symbol decoder 240, at step 425. Therefore, it is possible that the symbol stream provided by the symbol decoder 240 could be inverted. This can easily be rectified, however, during reception of known code words transmitted at known times in the received radio signal. For instance, in the well known FLEX™ signalling format, known "A" and "A-bar" words are transmitted at predetermined locations in the radio signal. The symbols provided by the symbol decoder 240 can, as a result, be correlated to the "A" and "A-bar" words to determine whether the symbols are inverted. When the symbols are inverted, the controller 130 could then simply invert the symbols as they are provided. Alternatively, in response to determining that the symbols are inverted, the controller 130 could multiply the current symbol polarity variable POL by negative one to correct the inverted data within the symbol decoder 240.

According to the present invention, Q_MAG and POL are conveniently used by the symbol decoder 240 to output a current symbol to the controller 130. Preferably, error information is also provided to the controller 130 to flag questionable symbols and, in some cases, indicate whether polarity or magnitude is questionable. The controller 130 uses the transmitted symbols to recover address and message information in a conventional manner. The error information according to the present invention can additionally be used by the controller 130 to provide confirmation of error corrected messages. For instance, when conventional cyclical redundancy codes (CRCs) are used by the controller 130 to error correct received information, the error information provided by the symbol decoder 240 can be employed to double-check that corrected symbols were in fact erroneous.

In alternate embodiments of the present invention, the provision of error information could be eliminated to provide a faster decoding process. In such an embodiment, the signal processor 125 need only comprise the Q channel elements. Specifically, the first and second filters 200, 205, the magnitude/phase detector 220, and the I channel symbol decoder 230 could be eliminated from the signal processor 125, thereby providing faster decoding of symbols. However, error information will not be provided to pinpoint questionable symbols without the I channel elements.

The signal processor 125 according to the present invention maximizes the signal-to-noise ratio (SNR) by examining only a narrow range of frequencies as compared with a conventional discriminator approach, which examines all possible frequencies. As a result, performance is improved over the conventional discriminator approach. Furthermore, the signal processor 125 operates accurately at baseband, which allows the processor 125 to be run at relatively low speeds. Therefore, the signal processor 125 consumes less power for an increased battery life.

The signal processor 125 additionally utilizes fewer parts than does a conventional discriminator, resulting in a less expensive radio communication device 100 (FIG. 1). When implemented in software, the signal processor 125 is also faster since hardware components need not be stabilized.

As mentioned above, I_FLAG and Q_FLAG are generated by sampling the filtered I and Q channels at times indicated by a clock signal, CLK, generated by the clock generator 152 (FIG. 4). A preferred method for generating the clock signal involves providing the filtered outputs of the Q channel matched filters 210, 215 to the clock generator 152, which preferably comprises a conventional peak and valley detection circuit (not shown). Using the outputs of the peak and valley detection circuit, symbol synchronization is obtained, during preamble, in a known manner such that the clock signal can then be generated.

Figure 8:
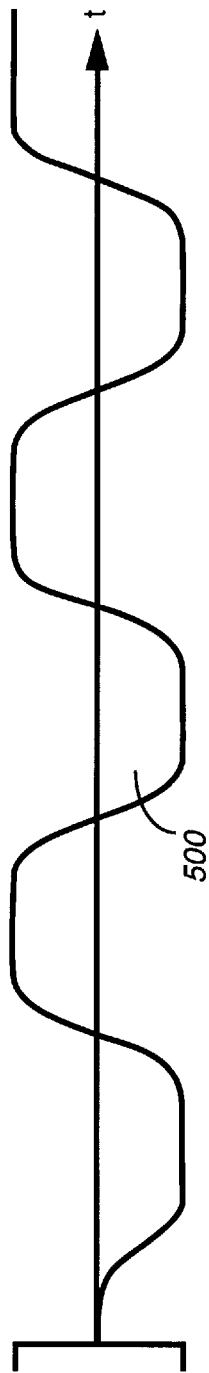
FIGS. 8–10 are signal diagrams received and filtered signals that are processed by the signal processor of FIG. 4 in accordance with the present invention.
Figure 9:
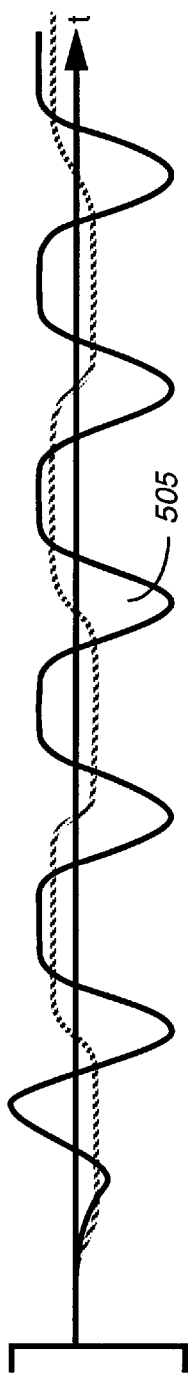
Figure 10:
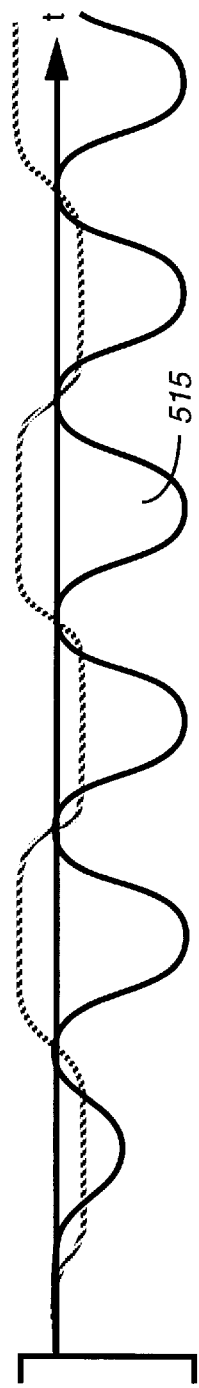

The symbol synchronization process can be better understood by referring to the signal diagrams of FIGS. 8–10. FIG. 8 depicts the filtered preamble signal 500 transmitted according to the ERMES protocol. FIG. 9 is a signal diagram depicting the "path 1" signal 505 provided by the filter 210 (FIG. 4) in the Q channel path. As shown, the filter 210 outputs a minimum that corresponds to the edge of each symbol. FIG. 10 is a signal diagram depicting the "path 2" signal 510 provided by the filter 215 in the Q channel path. The filter 215 outputs a minimum at the center of each symbol. Symbol synchronization can therefore be conveniently obtained using the outputs of the filters 210, 215 in the Q channel path.

In summary, the radio communication device as described above includes a zero IF receiver for providing a baseband signal to a signal processor. The signal processor processes the Q channel of the baseband signal to generate data symbols used by a controller in recovering address and message information. Additionally, according to the present invention, error information can be conveniently extracted from both the Q channel and the I channel by the signal processor to indicate to the controller which of the generated data symbols may be erroneous.

Because the signal processor is preferably implemented using software, it is less expensive and faster than many conventional discriminators. The signal processor also exhibits an improved performance because SNR is maximized. Furthermore, the signal processor according to the present invention can be run at relatively slow speeds for increased battery life, which is very important in portable radio communication devices such as pagers.

It will be appreciated by now that there has been provided an advantageous method of demodulation and generation of data symbols for use with direct conversion receivers.

What is claimed is:

1. A signal processor for recovering data symbols from a received signal, the signal processor comprising:
    matched filters for receiving and filtering a quadrature (Q) signal component of the received signal;
    a detector coupled to the matched filters for selecting a filtered signal provided by one of the matched filters and for labeling the filtered signal according to a magnitude and phase of the filtered signal to provide a Q channel output flag;
    a Q channel symbol/sign decoder coupled to the detector for processing the Q channel output flag to generate a Q channel magnitude variable and a polarity variable;
    a symbol decoder coupled to the Q channel symbol/sign decoder for generating a data symbol in accordance with the Q channel magnitude variable and the polarity variable; and
    a clock generator coupled to the matched filters for receiving filtered outputs of the matched filters and generating therefrom a clock signal used by the detector to sample the filtered outputs.

2. A signal processor for recovering data symbols from a received signal, the signal processor comprising:
    matched filters for receiving and filtering a quadrature (Q) signal component of the received signal;
    a detector coupled to the matched filters for selecting a filtered signal provided by one of the matched filters and for labeling the filtered signal according to a magnitude and phase of the filtered signal to provide a Q channel output flag;
    a Q channel symbol/sign decoder coupled to the detector for processing the Q channel output flag to generate a Q channel magnitude variable and a polarity variable, wherein the Q channel symbol/sign decoder further generates a Q channel error flag when the data symbol is questionable;
    a symbol decoder coupled to the Q channel symbol/sign decoder for generating a data symbol in accordance with the Q channel magnitude variable and the polarity variable, wherein the symbol decoder comprises:
        first receiving means for receiving the I channel error flag and the I channel magnitude variable;
        second receiving means for receiving the Q channel error flag and the Q channel magnitude variable; and
        output means coupled to the first and second receiving means for generating, when the data symbol is questionable, an error signal in accordance with the I channel error flag, the Q channel error flag, the I channel magnitude variable, and the Q channel magnitude variable;
    other matched filters for receiving and filtering an in-phase (I) signal component of the received signal;
    a second detector coupled to the other matched filters for selecting a second filtered signal provided by one of the other matched filters and for labeling the second filtered signal according to a magnitude and phase of the second filtered signal to provide an I channel output flag; and
    an I channel symbol decoder coupled to the second detector for processing the I channel output flag to generate an I channel magnitude variable and, when the data symbol is questionable, an I channel error flag.

3. A signal processor for recovering data symbols from a received signal, the signal processor comprising:
    matched filters for receiving and filtering a quadrature (Q) signal component of the received signal;
    a detector coupled to the matched filters for selecting a filtered signal provided by one of the matched filters and for labeling the filtered signal according to a magnitude and phase of the filtered signal to provide a Q channel output flag;
    a Q channel symbol/sign decoder coupled to the detector for processing the Q channel output flag to generate a Q channel magnitude variable and a polarity variable, wherein the Q channel symbol/sign decoder further generates a Q channel error flag when the data symbol is questionable;

a symbol decoder coupled to the Q channel symbol/sign decoder for generating a data symbol in accordance with the Q channel magnitude variable and the polarity variable;

other matched filters for receiving and filtering an in-phase (I) signal component of the received signal;

a second detector coupled to the other matched filters for selecting a second filtered signal provided by one of the other matched filters and for labeling the second filtered signal according to a magnitude and phase of the second filtered signal to provide an I channel output flag; and an I channel symbol decoder coupled to the second detector for processing the I channel output flag to generate an I channel magnitude variable and, when the data symbol is questionable, an I channel error flag, wherein the I channel symbol decoder is coupled to the Q channel symbol/sign decoder for providing at least a portion of the I channel output flag to the Q channel symbol/sign decoder.

4. A radio communication device for receiving selective call messages, the radio communication device comprising:

a receiver for processing a received signal to generate in-phase (I) and quadrature (Q) signal components;

a signal processor coupled to the receiver for recovering data symbols, the signal processor comprising:
matched filters for receiving and filtering the quadrature signal component of the received signal,
a detector coupled to the matched filters for selecting a filtered signal provided by one of the matched filters and for labeling the filtered signal according to a magnitude and phase of the filtered signal to provide a Q channel output flag,
a Q channel symbol/sign decoder coupled to the detector for processing the Q channel output flag to generate a Q channel magnitude variable and a polarity variable,
a symbol decoder coupled to the Q channel symbol/sign decoder for generating a data symbol in accordance with the Q channel magnitude variable and the polarity variable;

a controller coupled to the signal processor for receiving the data symbol and future data symbols to form a selective call message; and a clock generator coupled to the matched filters for receiving filtered outputs of the matched filters and generating therefrom a clock signal used by the detector to sample the filtered outputs.

5. A radio communication device for receiving selective call messages, the radio communication device comprising:

a receiver for processing a received signal to generate in-phase (I) and quadrature (Q) signal components;

a signal processor coupled to the receiver for recovering data symbols, the signal processor comprising:
matched filters for receiving and filtering the quadrature signal component of the received signal,
a detector coupled to the matched filters for selecting a filtered signal provided by one of the matched filters and for labeling the filtered signal according to a magnitude and phase of the filtered signal to provide a Q channel output flag,
a Q channel symbol/sign decoder coupled to the detector for processing the Q channel output flag to generate a Q channel magnitude variable and a polarity variable, and
a symbol decoder coupled to the Q channel symbol/sign decoder for generating a data symbol in accordance with the Q channel magnitude variable and the polarity variable;

a controller coupled to the signal processor for receiving the data symbol and future data symbols to form a selective call message;

an alert circuit coupled to the controller for announcing reception of the selective call message; and a display coupled to the controller for displaying the selective call message.

6. A radio communication device for receiving selective call messages, the radio communication device comprising:

a receiver for processing a received signal to generate in-phase (I) and quadrature (Q) signal components;

a signal processor coupled to the receiver for recovering data symbols, the signal processor comprising:
matched filters for receiving and filtering the quadrature signal component of the received signal,
a detector coupled to the matched filters for selecting a filtered signal provided by one of the matched filters and for labeling the filtered signal according to a magnitude and phase of the filtered signal to provide a Q channel output flag,
a Q channel symbol/sign decoder coupled to the detector for processing the Q channel output flag to generate a Q channel magnitude variable and a polarity variable, and
a symbol decoder coupled to the Q channel symbol/sign decoder for generating a data symbol in accordance with the Q channel magnitude variable and the polarity variable;

a controller coupled to the signal processor for receiving the data symbol and future data symbols to form a selective call message; and a code memory coupled to the controller for storing an address associated with the radio communication device.

7. A radio communication device for receiving selective call messages, the radio communication device comprising:

a receiver for processing a received signal to generate in-phase (I) and quadrature (Q) signal components;

a signal processor coupled to the receiver for recovering data symbols, the signal processor comprising:
matched filters for receiving and filtering the quadrature signal component of the received signal,
a detector coupled to the matched filters for selecting a filtered signal provided by one of the matched filters and for labeling the filtered signal according to a magnitude and phase of the filtered signal to provide a Q channel output flag,
a Q channel symbol/sign decoder coupled to the detector for processing the Q channel output flag to generate a Q channel magnitude variable and a polarity variable, wherein the Q channel symbol/sign decoder further generates a Q channel error flag when the data symbol is questionable,
a symbol decoder coupled to the Q channel symbol/sign decoder for generating a data symbol in accordance with the Q channel magnitude variable and the polarity variable,
other matched filters for receiving and filtering the in-phase signal component of the received signal,
a second detector coupled to the other matched filters for selecting a second filtered signal provided by one of the other matched filters and for labeling the second filtered signal according to a magnitude and phase of the second filtered signal to provide an I channel output flag, and an I channel symbol decoder coupled to the second detector for processing the I channel output flag to generate an I channel magnitude variable and, when the data symbol is questionable, an I channel error flag; and a controller coupled to the signal processor for receiving the data symbol and future data symbols to form a selective call message.

8. The radio communication device of claim 7, wherein the symbol decoder comprises:

first receiving means for receiving the I channel error flag and the I channel magnitude variable;

second receiving means for receiving the Q channel error flag and the Q channel magnitude variable; and output means coupled to the first and second receiving means for generating, when the data symbol is questionable, an error signal in accordance with the I channel error flag, the Q channel error flag, the I channel magnitude variable, and the Q channel magnitude variable, wherein the controller utilizes the error signal in error correcting the selective call message.

9. The radio communication device of claim 7, wherein the I channel symbol decoder is coupled to the Q channel symbol/sign decoder for providing at least a portion of the I channel output flag to the Q channel symbol/sign decoder.

10. A method in a radio communication device that receives selective call messages, for recovering data symbols from a received signal, the method comprising the steps of:

filtering, in a bank of matched filters, a quadrature (Q) signal component of the received signal to generate filtered signals;

selecting a filtered signal based on its amplitude, wherein the selecting step comprises the step of selecting the filtered signal having a greater amplitude;

labeling the filtered signal according to a magnitude and phase of the filtered signal to provide a Q channel output flag, wherein the labeling step comprises the steps of:

choosing a number designation of the Q channel output flag based on which of the matched filters provided the filtered signal that was selected; and choosing a letter designation of the Q channel output flag based upon whether an amplitude of the filtered signal is positive or negative;

processing the Q channel output flag to generate a Q channel magnitude variable and a polarity variable;

generating a data symbol in accordance with the Q channel magnitude variable and the polarity variable; and forming a selective call message from the data symbol.

11. The method of claim 10, wherein the processing step comprises the steps of:

setting the polarity variable in accordance with the letter designation of the Q channel output flag; and setting the Q channel magnitude variable in accordance with the number designation of the Q channel output flag.

12. The method of claim 11, wherein the generating step comprises the steps of:

setting a symbol polarity variable in accordance with the polarity variable generated during the processing step;

referencing possible data symbols;

determining which of the possible data symbols is associated with both the Q channel magnitude variable and the symbol polarity variable; and outputting the data symbol in accordance with a selected one of the possible data symbols.

13. The method of claim 12, wherein the determining step comprises the steps of:

multiplying the symbol polarity variable and the Q channel magnitude variable to generate a product, wherein the product is associated with a possible data symbol; and choosing the selected one of the possible data symbols that is associated with the product.

* * * * *